Sept. 14, 1965     A. BOGOT     3,206,162
DOUBLE GATE VALVE

Filed Dec. 28, 1962     2 Sheets-Sheet 1

INVENTOR
ALEXANDER BOGOT
BY Harris G. Luther
ATTORNEY

Sept. 14, 1965     A. BOGOT     3,206,162
DOUBLE GATE VALVE

Filed Dec. 28, 1962     2 Sheets-Sheet 2

INVENTOR
ALEXANDER BOGOT
BY Harris G. Luther
ATTORNEY

United States Patent Office 3,206,162
Patented Sept. 14, 1965

3,206,162
DOUBLE GATE VALVE
Alexander Bogot, West Hartford, Conn., assignor to Combustion Engineering, Inc., Windsor, Conn., a corporation of Delaware
Filed Dec. 28, 1962, Ser. No. 248,031
8 Claims. (Cl. 251—172)

This invention relates to a gate valve and particularly to a valve having double sealing surfaces.

An object of this invention is a valve which will provide additional sealing surfaces and in which any leakage will be into instead of from the valved member.

A further object is a shut-off valve for closing a hot pressurized chamber and including means for introducing cool pressurized fluid into the valve back of additional sealing means so that any valve leakage will be toward and not from the pressurized chamber.

A still further object is a gate valve having four sealing seats.

Other and additional objects and advantages will be apparent from the following specification and the attached drawings in which.

Figure 1:
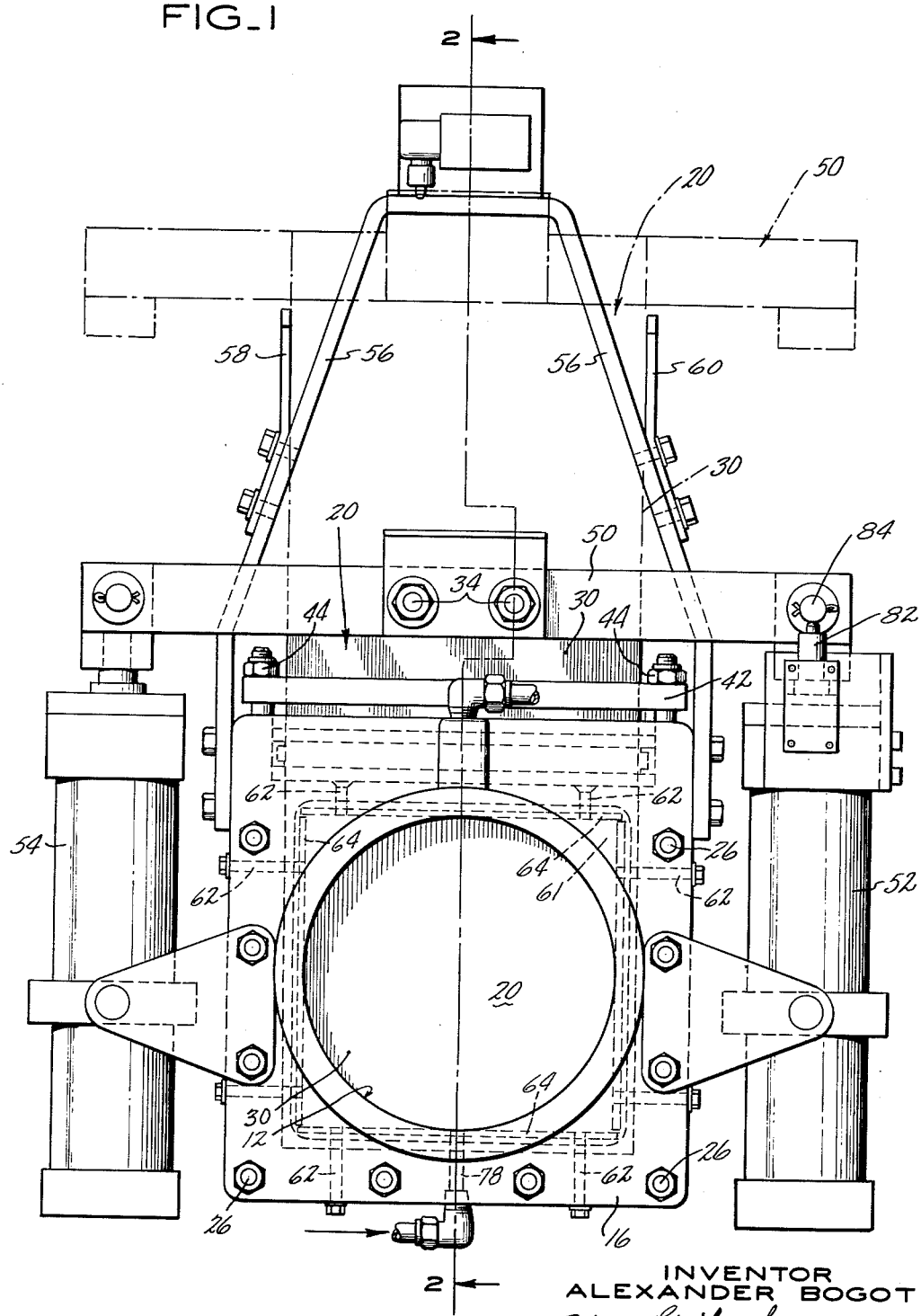
FIG. 1 is an end view of the valve incorporating the invention.
Figure 2:
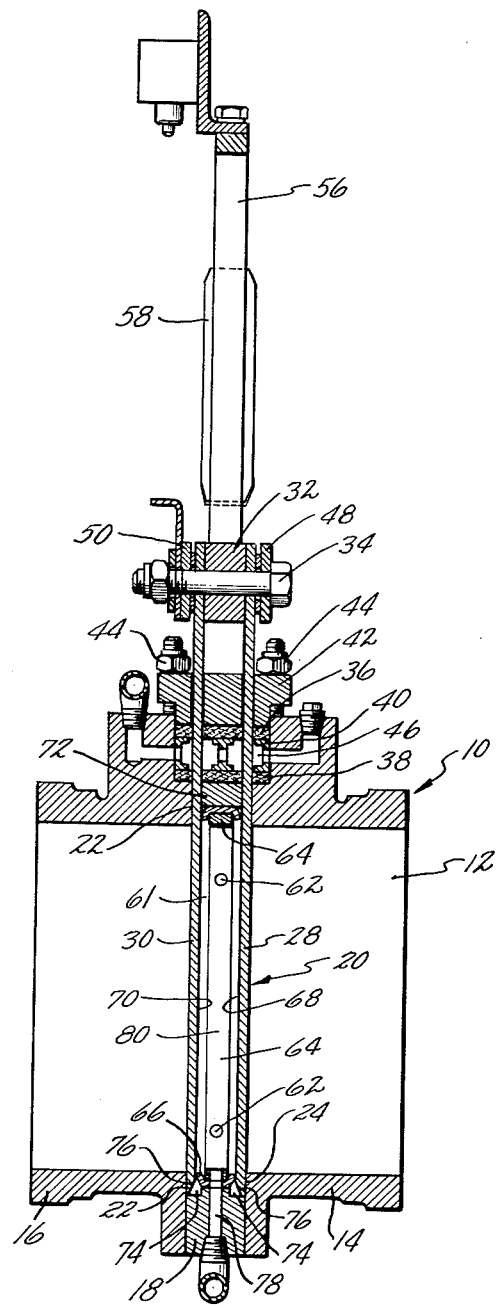
FIG. 2 is a longitudinal section through the valve of FIG. 1.

In the control of the flow of fuel, such as comminuted coal and air, between a fuel source, such as a pulverizing mill, and a furnace where the fuel is burned it may be desirable or necessary to disconnect one source from the furnace while continuing to operate the furnace with other sources of fuel. In such a case it is necessary to prevent any leakage of the hot furnace gases which may have temperatures in the neighborhood of 3000° F. from leaking back past the valve or even coming in contact with the valve. The valve of the present invention is provided with an extra set of fixed valve seats to prevent such leakage and in addition has provision for supplying pressure fluid such as compressed air at a pressure higher than the pressure in the furnace, back of the extra valve seats so that any leakage of the valve would be from the high pressure source through both valve seats towards instead of from the furnace thus protecting the valve and its seats from the hot furnace gases.

This valve finds utility in the connection between any two chambers maintained at different pressures and where it is necessary to open one of the chambers to atmosphere.

As shown in the drawings the valve comprises a body having a through passage 12 therethrough. The body may comprise two metal parts 14 and 16 separated by a spacer member 18 to form a channel or guide between the members 14 and 16 for receiving the gate 20. The sides 22 and 24 of the gate receiving channel adjacent the through passage 12 provide fixed seats and metal to metal sealing means for the outside faces of the gate 20 which is slid across said seats in its closing and opening movements. The valve parts 14 and 16 may be secured to each other and clamp the spacing member 18 between them by any suitable means, such as bolts 26.

The gate 20 comprises a unit having two parallel spaced leaves or plates 28 and 30 forming separate spaced gates held in spaced relation by a spacer 32 and secured together by any suitable means, such as bolts 34. The spaced leaves pass through spaced packing members 36 and 38 held in spaced relation by spacers 40 and compressed by packing compressor 42 adjustable by nuts 44. The chamber 46 between the packing members may be supplied with pressure fluid, such as compressed air, at a pressure higher than that controlled by the valve to prevent leakage from the through passage 12 outward past the leaves 28 and 30.

A pair of straps 48 and 50 straddle, and are secured at their mid-point to the gate 20 and at either end to pistons, not shown, operating in cylinders 52 and 54 to raise and lower the gate 20 by the introduction of and withdrawal of suitable pressure fluid to and from the cylinders. A frame 56 bolted to the spacer 18 extends above the valve body 10 and serves to guide the gate in its opening and closing movements outside of the valve body. The members 58 and 60 carried by the frame 56 coact with the edges of the gate 20 and with the inner surfaces of the straps 48 and 50 to additionally guide the gate in its movements.

The spacer member 18 has a through passage 61 aligned with the through passage 12 in the valve body, which passage 61 may be of any desired shape or cross section such as square as shown in FIG. 1. Secured in air tight relation to the inner surface of this through passage 61 by any suitable means such as cap screws 62 and retaining strip 64 is a ribbon in the form of an annulus or band of flexible material 66 the opposite ends of which form annular or closed band seats coacting with the inner faces 68 and 70 of the leaves 28 and 30 which straddle the valve seats formed by the flexible material 66. The spacer member 18 thus acts as a frame supporting the seats formed by the flexible material 66. Opposite sides of the upper portion 72 of the spacer strip 18 are cut away to provide a channel between the spacer strip and the valve body for the passage of the leaves 28 and 30. Suitable channels 74 are provided around the through passage 61 in the member 18 in the sides and bottom of the member 18 to accommodate the lower and side edges of the gate leaves 28 and 30. The inside bottom edges of the leaves 28 and 30 are beveled as at 76 to assist in passing over the valve seats formed by the flexible member 66. The flexible or resilient member 66 may be made of any suitable material such as neoprene or various types of rubber. A conduit 78 is provided in the spacing member 18 leading from the exterior thereof through the flexible sealing member 66 into the through passage 61 through the spacing member 18 and into the space 80 between the leaves 28 and 30 through which pressure fluid may be led. This pressure fluid led through the conduit 78 is at a pressure higher than the pressure on either of the outside faces of the leaves 28, 30 and will act to more firmly seat the valve seats formed by the flexible member 66 against the inner valve faces of the leaves 28 and 30 and will also force the leaves 28 and 30 outwardly to more firmly seat the outer valve faces of the leaves or plates 28, 30 in their metal to metal sealing contact with the valve seats formed on the inner faces of the valve body parts 14, 16 of the valve body 10.

As long as the pressure in chamber 80 is higher than the pressure on either side of the gate 20 only the comparatively cool pressure fluid from chamber 80 can leak through the valve seats. This leakage would be from between the plates to the outside of the plates on either or both sides of the gate. Thus the hot gases from the furnace are prevented from contacting the valve members and the valve is maintained in a comparatively cool condition.

Suitable means such as a microswitch 82 may be actuated by a portion of the valve moving mechanisms such as pin 84 when the valve or gate 20 approaches its fully closed position to actuate any suitable mechanisms such as a valve, not shown, controlling the introduction of pressure fluid, such as compressed air which is cool compared to the furnace gases, to the chamber 80 surrounded by the valve seats formed by the flexible member 66 and between the valve plates 28 and 30.

It is to be understood that the invention is not limited to the specific embodiment herein illustrated and described but may be used in other ways without departure from its spirit and that various changes can be made which would come within the scope of the invention which is limited only by the appended claims.

I claim:

1. In a single gate valve for controlling flow of fluid under pressure, a pair of spaced substantially flat interconnected gates, a first pair of fixed valve seats, means for moving said spaced gates in their planes between and across said seats for valve closing and fluid flow blocking cooperation with said seats, a second pair of fixed seats, means supporting said second pair of seats between said first pair of seats for valve closing and fluid flow blocking cooperation with said gates and means introducing pressure fluid at a pressure higher than the pressure of the controlled fluid into the space between said gates and between said second pair of seats.

2. In a single gate valve for controlling flow of fluid under pressure, a pair of spaced, substantially flat, interconnected gates, a first pair of fixed valve seats, means for moving said spaced gates in their planes between and across said seats for valve closing and fluid flow blocking cooperation with said seats, a second pair of seats comprising a frame supporting annular seats, means supporting said second pair of seats between said first pair of seats for valve closing and fluid flow blocking cooperation with said gates, and means introducing pressure fluid into the space surrounded by said frame.

3. A flow controlling double gate valve having a single closure unit comprising a pair of spaced gates formed of plates each having two valve faces and forming outside valve faces and inside valve faces on said pair of gates, a pair of spaced sealing seats cooperating with said outside faces for closing said valve and blocking flow therethrough, a second pair of spaced sealing seats cooperating with said inside faces to block flow and provide separate flow blocking means for said valve and means introducing pressure fluid between said gates and said second pair of seats to urge all four valve faces and their cooperating seats into closer sealing relation.

4. A flow controlling double gate valve having a single closure unit adapted to close a passageway from a chamber containing heated fluid comprising a pair of spaced plates forming spaced gates with a valve face on each side of each plate, forming inside valve faces and outside valve faces, a first pair of valve seats, means for moving said spaced plates in the plane of said plates between and across said seats to bring said valve into valve closing position, said outside valve faces cooperating with said seats and providing flow blocking means, a second pair of spaced seats, means supporting said second pair of seats between said first pair of seats and between said plates for cooperation with said inside valve faces upon movement of said plates to said valve closing position to provide separate flow blocking means and means introducing pressure fluid cooler than, and at a pressure higher than, the fluid in said chamber, into the space between said plates when in closed position and between said second pair of spaced seats to assist in sealing all four seats and preventing flow of said heated fluid toward said plates.

5. A flow controlling double gate valve having a single closure unit comprising a pair of spaced plates forming spaced gates with a valve face on each side of each plate, forming inside valve faces and outside valve faces, a first pair of valve seats, means for moving said spaced plates in the plane of said plates between and across said seats to bring said valve into valve closing and flow blocking position, said outside valve faces cooperating with said seats and providing flow blocking means, a second pair of spaced seats comprising a flexible annulus with opposite ends forming a pair of annular valve seats, means supporting said second pair of seats between said first pair of seats and between said plates for cooperation with said inside valve faces upon movement of said plates to said valve closing position to provide separate flow blocking means.

6. A double gate valve as claimed in claim 5 including means for introducing pressure fluid between said plates and between said second pair of seats to urge said plates against said first pair of valve seats and said second pair of valve seats against said plates.

7. A double gate valve as claimed in claim 6 including means for simultaneously moving both plates and means responsive to valve closing movement for activating said pressure fluid introducing means.

8. A fluid controlling double gate valve having a through passage, a first pair of valve seats surrounding said passage, a gate unit movable between, and cooperating with, said seats to close said valve, a second pair of valve seats surrounding said passage and located between said first pair of seats, said gate unit movable to straddle, and cooperate with said second pair of seats, to additionally close said valve, and means for introducing pressure fluid independent of the fluid being controlled by said valve to said closed valve in the passage between said second pair of seats.

References Cited by the Examiner

UNITED STATES PATENTS

| | | | |
|---|---|---|---|
| 940,577 | 11/09 | Barrett | 137—614.11 |
| 1,733,685 | 10/29 | Gamble | 251—175 |
| 2,374,195 | 4/45 | Guarnaschelli | 251—193 XR |
| 2,982,305 | 5/61 | Grove | 137—614.11 |
| 2,982,513 | 5/61 | Krummel | 251—329 XR |
| 3,041,037 | 6/62 | Patrick | 251—195 |

LAVERNE D. GEIGER, *Primary Examiner.*